US009158161B2

(12) United States Patent
Kim

(10) Patent No.: US 9,158,161 B2
(45) Date of Patent: Oct. 13, 2015

(54) PATTERN GENERATOR USING LIQUID CRYSTAL AND METHOD THEREOF

(71) Applicant: KYUNGPOOK NATIONAL UNIVERSITY INDUSTRY-ACADEMIC COOPERATION FOUNDATION, Daegu (KR)

(72) Inventor: Hak-Rin Kim, Daegu (KR)

(73) Assignee: KYUNGPOOK NATIONAL UNIVERSITY INDUSTRY-ACADEMIC COOPERATION FOUNDATION (KR)

(*) Notice: Subject to any disclaimer, the term of this patent is extended or adjusted under 35 U.S.C. 154(b) by 144 days.

(21) Appl. No.: 14/043,092

(22) Filed: Oct. 1, 2013

(65) Prior Publication Data
US 2015/0092125 A1 Apr. 2, 2015

(51) Int. Cl.
*G01B 11/24* (2006.01)
*G02F 1/1341* (2006.01)
*G02F 1/1337* (2006.01)
*G02F 1/29* (2006.01)

(52) U.S. Cl.
CPC .......... *G02F 1/1341* (2013.01); *G01B 11/2441* (2013.01); *G02F 1/133753* (2013.01); *G02F 1/29* (2013.01); *G02F 2001/133757* (2013.01); *G02F 2001/291* (2013.01)

(58) Field of Classification Search
CPC .............................. G01B 11/2441; G01B 11/25
USPC .............................. 349/33; 356/603–605, 519
See application file for complete search history.

(56) References Cited

U.S. PATENT DOCUMENTS

2011/0080471 A1* 4/2011 Song et al. ................. 348/46

FOREIGN PATENT DOCUMENTS

| KR | 1020040055014 | 6/2004 |
| KR | 1020040110887 | 12/2004 |
| KR | 100892875 | 4/2009 |
| KR | 1020110046222 | 5/2011 |
| KR | 1020110083328 | 7/2011 |

* cited by examiner

*Primary Examiner* — Thanh-Nhan P Nguyen
(74) *Attorney, Agent, or Firm* — Cantor Colburn LLP

(57) ABSTRACT

The dynamic fringe pattern generating apparatus includes a liquid crystal layer including a first area and a second area, a lower layer and an upper layer. The upper layer includes a slit array layer where a micro-slit array including a common slit and a plurality of selection slits are formed and an upper transparent electrode layer where a reference electrode and a plurality of selection electrodes are formed. In the dynamic fringe pattern generating apparatus, different fringe patterns are phase-shifted by sequentially controlling a voltage applied to the reference electrode and to the selection electrodes.

18 Claims, 9 Drawing Sheets

(a)     (b)     (c)     (d)

(a)　　(b)　　(c)　　(d)

(a)　　　(b)　　　(c)　　　(d)

(a)     (b)     (c)     (d)

PATTERN GENERATOR USING LIQUID CRYSTAL AND METHOD THEREOF

BACKGROUND OF THE INVENTION

1. Field of the Invention

The present invention relates to a dynamic fringe pattern generating apparatus using liquid crystal and a method of manufacturing the same, and more particularly, a dynamic fringe pattern generating apparatus for generating a fringe pattern used for a three-dimensional surface profilometer by using a single liquid crystal sample and by simultaneously controlling phase-shifting of the fringe pattern and a change in period of the fringe pattern by selectively applying a voltage and a method of manufacturing the same.

2. Description of the Prior Art

A three-dimensional surface profilometry (optical surface profilometry) is a technique capable of measuring position information and depth information of a surface of an object through an optical method. Since the technique has an advantage of being able to speedily obtaining three-dimensional surface profile information without a direct contact with the surface of the object, recently, the technique has been widely applied in the fields of medical industry, robotics industry, and industrial measurement instrument.

A three-dimensional surface profilometer is an apparatus for measuring a surface profile by calculating depth information from a distorted image of a fringe pattern irradiated on a surface of an object. FIG. 1 is conceptual diagrams illustrating principles of operations of the three-dimensional surface profilometer. Referring to (a) of FIG. 1, the three-dimensional surface profilometer is configured to include a projector 15 which irradiates a fringe pattern on a surface of an object 13 as a measurement object and a unit 17 which images the surface of the object 13 irradiated with the fringe pattern. The irradiation point of the fringe pattern and the image point are designed to be separated from each other, so that the surface profile can be measured from a degree of distortion of the irradiated fringe pattern, (b) of FIG. 1 illustrates the object 13 which is to be measured and a reconstruction area which is to be reconstructed. The projector 15 sequentially irradiates fringe patterns having a plurality of frequencies on the surface of the object 13.

Next, the fringe pattern which is irradiated on the surface of the object and is distorted is imaged by using a camera 17. (c) of FIG. 1 illustrates images of the fringe patterns irradiated on the surface of the object. The degree of distortion of the fringe pattern is measured from the image, and surface information of the object is calculated based on the degree of distortion of the fringe pattern, so that the surface profile is reconstructed as illustrated in (d) of FIG. 1.

In order to improve performance of the above-described three-dimensional surface profilometer, a 4-step phase-shifting method and a multi-spatial frequency method are frequently applied. The phase-shifting method is frequently used in order to reduce uncertainty of reconstruction phase information caused by a noise signal due to ambient light and a cosine function. The multi-spatial frequency method is frequently used in order to increase a measurable depth range and to improve measurement accuracy. Therefore, a three-dimensional surface profilometer in the related art uses optical components such as a digital micro-mirror device (DMD), an acousto-optical modulator (AOM), and a spatial light modulator (SLM) and apparatuses such as a projector. However, since the optical components are expensive and have a considerable volume, there are problems in terms of miniaturization and commercialization.

SUMMARY OF THE INVENTION

The present invention is to provide a dynamic fringe pattern generating apparatus capable of changing a period of coherency of light incident on a multiple aligned liquid crystal sample by using a slit array according to a condition of a voltage applied to a liquid crystal side and capable of simultaneously implementing a shifting characteristic and a period changing characteristic of a fringe pattern by only switching a voltage without mechanical driving based on a modulation characteristic of an effective refractive index according to the applied voltage.

The present invention is also to provide a micro-miniaturized dynamic fringe pattern generating apparatus using liquid crystal.

According to a first aspect of the present invention, there is provided a dynamic fringe pattern generating apparatus including: a liquid crystal layer configured to include a first area where liquid crystal is aligned in a first mode and a second area where liquid crystal is aligned in a second mode; a lower layer disposed on a first plane of the liquid crystal layer; and an upper layer disposed on a second plane facing the first plane of the liquid crystal layer, wherein the lower layer is configured to include: a lower alignment layer which is disposed to be in contact with first plane of the liquid crystal layer and is aligned in a first direction; and a lower transparent electrode layer which is disposed so that the one surface is in contact with the lower alignment layer, wherein the upper layer is configured to include: a transparent substrate constructed with an insulating material; an upper alignment layer which is disposed to be in contact with a second plane of the liquid crystal layer and is aligned so that regions corresponding to first and second areas of the liquid crystal layer are aligned in different alignment directions; an upper transparent electrode layer which is disposed between the first and second planes of the transparent substrate and is configured to one reference electrode formed at a position corresponding to the first area and a plurality of selection electrodes formed at positions corresponding to the second area; and a slit array layer which is disposed on the second plane facing the first plane of the transparent substrate constructed with a non-transparent material and is configured to include a slit array including a common slit and a plurality of selection slits, wherein the common slit of the slit array is disposed above the first area of the liquid crystal layer, and the selection slits are disposed above the second area of the liquid crystal layer, and wherein the reference electrode and a plurality of the selection electrodes are disposed at positions corresponding to the common slit and the selection slits.

In the above first aspect, in a state where polarized light capable of passing through the first area is provided to the lower layer, spatial frequency and phase shifting of a fringe pattern output through the slit array may be adjusted by controlling voltages to the reference electrode and the selection electrodes.

In addition, in the above first aspect, the dynamic fringe pattern generating apparatus may further include a polarizing plate (polarizer) on the lower layer, wherein a polarization direction of the polarizing plate is parallel to the alignment direction of the lower alignment layer.

In addition, in the above first aspect, the dynamic fringe pattern generating apparatus may further including an analyzing plate (analyzer) on the upper layer, wherein a polarization direction of the analyzing plate is parallel to the alignment direction of the lower alignment layer.

In addition, in the above first aspect, the liquid crystal in the first area of the liquid crystal layer may be aligned in a homogeneous planar mode, and the liquid crystal in the second area is aligned in a twisted nematic (TN) mode.

In addition, in the above first aspect, the upper and lower alignment layers which are in contact with the first area of the liquid crystal layer may be aligned in the same direction, and the upper and lower alignment layers which are in contact with the second layer may be aligned in perpendicular directions.

In addition, in the above first aspect, the liquid crystal of the liquid crystal layer may have dielectric anisotropy (Δ∈) of more than 0.

In addition, in the above first aspect, the first area of the liquid crystal may be aligned so that light passes through irrespective of an applied voltage, and the second area of the liquid crystal is aligned so that light passe through when a voltage is applied to the second area.

In addition, in the above first aspect, the first area may be a variable OPL region where an optical path length (hereinafter, referred to as an 'OPL') is varied according to an applied voltage, and the second area may be a fixed OPL region where the OPL is constant after a sufficient voltage is applied.

In addition, in the above first aspect, in a state where a voltage is not applied to the reference electrode, a voltage may be applied to one selection electrode, so that the fringe pattern is generated, and a spatial frequency of the fringe pattern may be determined according to a separation distance between the common slit and the selection slit from which light is output.

In particular, preferably, the selection electrodes to which voltages are to be applied may be sequentially changed, so that a plurality of the fringe patterns having different spatial frequencies are sequentially generated.

In addition, in the above first aspect, by applying a voltage to one of the selection electrodes and adjusting a voltage applied to the reference electrode, the fringe pattern generated by light passing through the common slit and the selection slit corresponding to the selection electrode applied with the voltage may be phase-shifted, and a spatial frequency of the fringe pattern may be determined according to a separation distance between the common slit and the selection slit from which light is output.

In addition, in the above first aspect, by sequentially controlling a voltage applied to the reference electrode and a voltage applied to the selection electrodes, a plurality of the fringe patterns having different spatial frequencies may be output, and the fringe pattern having an arbitrary fringe pattern may be phase-shifted.

According to a second aspect of the present invention, there is provided a method of manufacturing a dynamic fringe pattern generating apparatus, including steps of: (a) forming an upper layer; (b) forming a lower layer; and (c) disposing the upper layer and the lower layer to be separated by a predetermined separation distance, adhering the upper and lower layers, injecting liquid crystal between the upper and lower layers, wherein the step (a) is configured to include steps of: (a1) depositing a transparent electrode material on a first plane of a transparent substrate and performing patterning so as to form an upper transparent electrode layer configured to include a plurality of electrodes; (a2) forming a slit array layer including a slit array configured to include a plurality of slits on a second plane facing the first plane of the transparent substrate; (a3) depositing an upper alignment layer on the first plane of the transparent substrate where the upper transparent electrode layer is formed; and (a4) dividing the upper alignment layer into a first area and a second area and alignment-processing the first area and the second area in different alignment directions, and wherein the step (b) is configured to include steps of: (b1) forming a lower transparent electrode layer; (b2) forming a lower alignment layer on a first plane of the lower transparent electrode layer; (b3) alignment-processing the lower alignment layer in one alignment direction.

In the above second aspect, the step (a2) may include steps of: applying photoresist on the second plane facing the first plane of the transparent substrate; patterning the photoresist in a slit array form; depositing a non-transparent material for the slit array layer on a surface of the patterned photoresist; and removing the photoresist so as to form the slit array layer including the slit array.

In addition, in the above second aspect, the first area of the upper alignment layer and the lower alignment layer may be alignment-processed in the same alignment direction, and the second area of the upper alignment layer and the lower alignment layer may be alignment-processed in perpendicular alignment directions.

In addition, in the above second aspect, electrodes which are electrically isolated may be disposed under the slits.

In addition, in the above second aspect, the slit array may be configured so that a plurality of the slits are disposed with a period of a constant distance.

In a dynamic fringe pattern generating apparatus according to the present invention, it is possible to change a period of coherency of light incident on a multiple aligned liquid crystal sample by using a slit array according to a condition of a voltage applied to a liquid crystal side, and it is possible to simultaneously implement a shifting characteristic and a period changing characteristic of a fringe pattern by only switching a voltage without mechanical driving based on a modulation characteristic of an effective refractive index according to the applied voltage.

In addition, according to the present invention, it is possible to miniaturize a dynamic fringe pattern generating apparatus down to dimension of 5×5 mm or less by using semiconductor processes. The size of the dynamic fringe pattern generating apparatus corresponds to about $\frac{1}{10}$ or less times the size of a pattering generating apparatus of a three-dimensional surface profilometer using optical components in the related art. In this manner, by using the dynamic fringe pattern generating apparatus according to the present invention, it is possible to miniaturize the three-dimensional surface profilometer.

DETAILED DESCRIPTION OF THE INVENTION

Hereinafter, a structure and operation method of a dynamic fringe pattern generating apparatus according to an exemplary embodiment of the present invention and a method of manufacturing the same will be described in detail with reference to the attached drawings.

Figure 1:
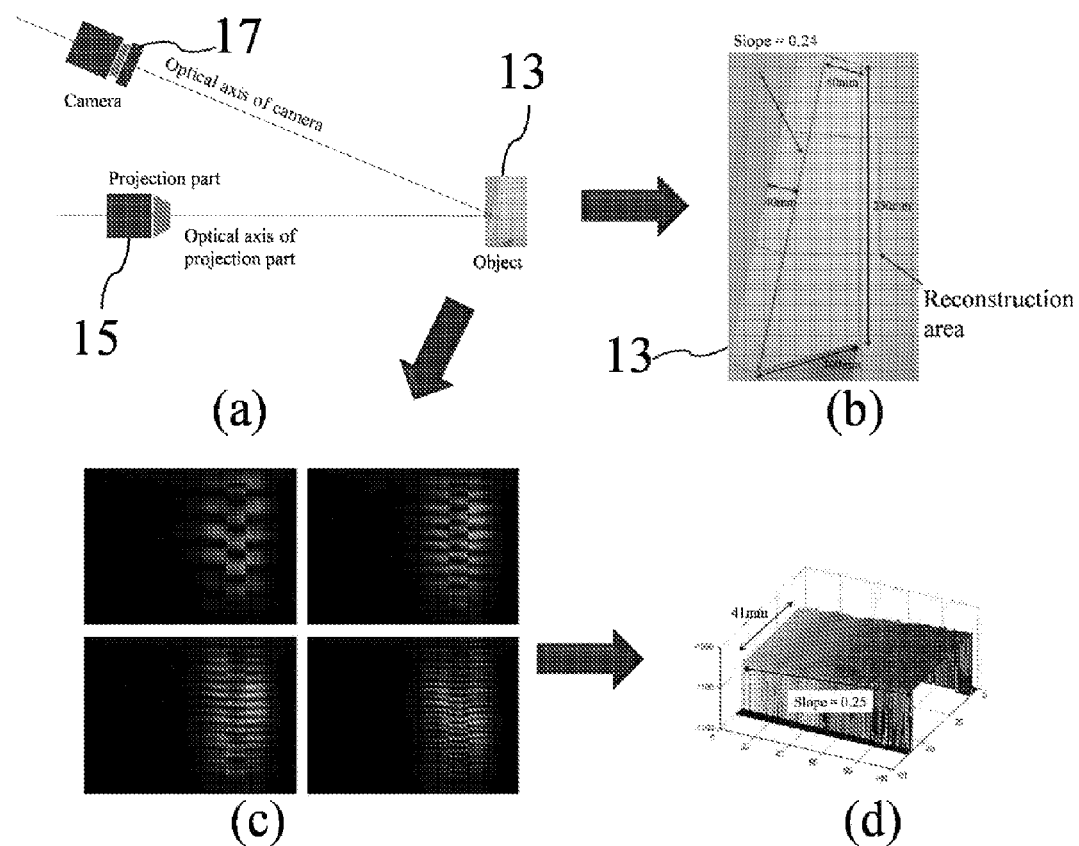
FIG. 1 is a conceptual diagram illustrating principles of operations of a three-dimensional surface profilometer.
Figure 2:
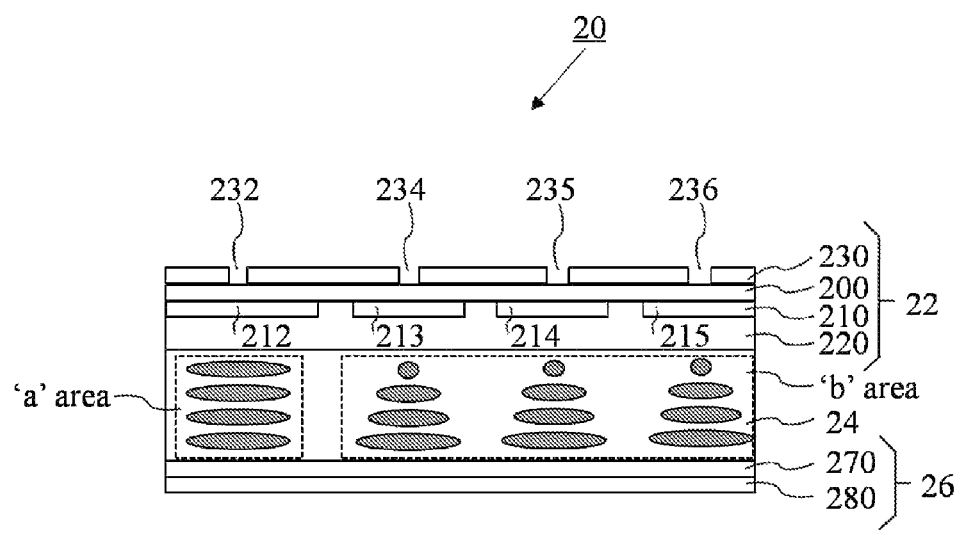
FIG. 2 is a schematic cross-sectional diagram illustrating a dynamic fringe pattern generating apparatus according to an exemplary embodiment of the present invention.

FIG. 2 is a schematic cross-sectional diagram illustrating the dynamic fringe pattern generating apparatus according to the exemplary embodiment of the present invention.

Referring to FIG. 2, the dynamic fringe pattern generating apparatus 20 is configured to include a liquid crystal layer 24, an upper layer 22, and a lower layer 26.

The liquid crystal layer 24 has a first area (area 'a' in FIG. 2) where the liquid crystal is aligned in a first mode and a second area (area 'b' in FIG. 2) where the liquid crystal is aligned in a second mode. It is preferable that the liquid crystal layer is constructed with the liquid crystal having a characteristic of dielectric anisotropy ($\Delta \in = \in_{\parallel} - \in_{\perp}$) being larger than 0, so that the liquid crystal is aligned in a direction parallel to the direction of applied electric field when a voltage is applied to the liquid crystal.

In the first area of the liquid crystal layer, in the case where the liquid crystal is initially aligned in a uniform single horizontal alignment mode (homogeneous planar mode) and linearly polarized light is incident in the initial alignment direction irrespective of an applied voltage, even after the light passes through the liquid crystal layer, the polarization state of the light is not changed. In a lower substrate of the liquid crystal sample on which the light is incident, a polarizer has transmission axis in the direction parallel to the initial alignment direction of the liquid crystal in the first area is disposed. In addition, in an upper substrate of the light liquid crystal sample, a polarizer having the same transmission axis is disposed. Therefore, since an effective refractive index of the liquid crystal layer is changed according to the applied voltage, the first area of the liquid crystal layer becomes a voltage—variable OPL region where an optical path length (hereinafter, referred to as an 'OPL') can be varied by controlling the applied voltage. The intensity of the light passing through the upper polarizer is irrelevant to the applied voltage.

In the second area of the liquid crystal layer, the liquid crystal is initially aligned in a 90-degree twisted structure according to alignment conditions of the upper and lower substrate in a twisted nematic (TN) mode. In this case, the alignment direction of the lower substrate is parallel to the transmission axis of the polarizer of the lower substrate, and the alignment direction of the upper substrate is perpendicular to the transmission axis of the polarizer of the upper substrate. When no voltage is applied, the light incident on the second area becomes 90-degree rotated linearly polarized light due to polarization changing effect of the 90-degree twisted nematic liquid crystal to reach the polarizer of the upper substrate, so that the light cannot transmit the upper substrate.

When a voltage is sufficiently applied, the liquid crystal is re-aligned parallel to the direction of the electric field and, thus, the liquid crystal layer has no polarization changing effect, so that the transmission axis of the lower substrate is not changed to be maintained, and when the light incident on the second area reaches the polarizer of the upper substrate, the light transmits the upper substrate. Therefore, when a voltage is sufficiently applied, since all the liquid crystals are re-aligned in the direction of the electric field, the second area of the liquid crystal layer becomes a fixed OPL region having a constant optical path length according to a thickness of the liquid crystal sample and an ordinary refractive index of the liquid crystal.

The lower layer 26 is disposed on a first plane of the liquid crystal layer, and the lower layer 26 is configured to include a lower alignment layer 270 and a lower transparent electrode layer 280. The lower alignment layer 270 is disposed to be in contact with the liquid crystal layer, and an alignment process is performed in one direction on the liquid crystal layer. The lower transparent electrode layer 280 is disposed to be in contact with the lower alignment layer and is preferably constructed as one electrode.

the upper layer 22 is disposed on a second plane facing a first plane of the liquid crystal layer and is configured to include a transparent substrate 200 constructed with an insulating material, an upper alignment layer 220, an upper transparent electrode layer 210 including a plurality of patterned electrodes, and a slit array layer 230 where a slit array is formed.

The upper alignment layer 220 is configured to be in contact with the second plane of the liquid crystal layer, and regions corresponding to the first and second areas of the liquid crystal layer are alignment-processed in different directions, that is, in the perpendicular directions. It is preferable that the upper and lower alignment layers which are in contact with the first are of the liquid crystal layer are alignment-processed in the same direction so that the liquid crystal in the first area is aligned in a homogeneous planar mode. In addition, it is referable that the upper and lower alignment layers which hare in contact with the second area of the liquid crystal layer are alignment-processed in the perpendicular directions so that the cylindrical lens in the second area is aligned in a twisted nematic mode.

The upper transparent electrode layer 210 is configured to include a reference electrode 212 and a plurality of selection electrodes 213, 214, and 215 which are formed through patterning and is disposed between the first plane of the transparent substrate and the upper alignment layer. The reference electrode is disposed at a position corresponding to the first area of the liquid crystal layer, and the selection electrodes is disposed at a position corresponding to the second area of the liquid crystal layer.

The slit array layer 230 is constructed with a non-transparent material such as aluminum (Al) and is disposed on the second plane facing the first plane of the transparent substrate. A slit array is formed in the slit array layer, and the slit array is configured to include a common slit 232 and two or more selection slits 234, 235, and 236. The common slit of the slit array is disposed above the first area of the liquid crystal layer, and the selection slits are disposed above the second area of the liquid crystal layer. The slits constituting the slit array may be disposed in a predetermined period. However, it is not necessary that the slits are disposed with the same separation distance. A fringe pattern is generated by light beams passing through the two slits, and a spatial frequency of the fringe pattern is determined according to the separation distance between the two slits. Therefore, the number of selection slits of the dynamic fringe pattern generating apparatus according to the present invention is determined according to the number of spatial frequencies which are to be implemented.

The reference electrode and a plurality of the selection electrodes of the upper transparent electrode layer are disposed at the positions corresponding to the common slit and the selection slits, and the electrodes are electrically isolated from the adjacent electrodes.

In the dynamic fringe pattern generating apparatus, light is allowed to be incident in the direction from the lower layer to the upper layer of the substrate. The incident light needs to be polarized light having a polarization direction which is parallel to the alignment direction of the lower alignment layer. On the other hand, the dynamic fringe pattern generating apparatus according to the present invention is configured to further include a polarizing plate (polarizer) on the lower layer and a polarizing plate on the upper layer, and the polarizing plates are configured to allow polarized light having a polarization direction which is parallel to the alignment direction of the lower alignment layer to pass through. In this manner, since the polarizing plates are included, all kinds of a light source can be used.

In addition, the dynamic fringe pattern generating apparatus according to the present invention is configured to include an analyzing plate (analyzer) on the upper layer. The analyzing plate is configured allow only the polarized light having a polarization direction which is parallel to the alignment direction of the lower alignment layer to pass through.

<Method of Driving Dynamic Fringe Pattern Generating Apparatus—Multiple Spatial Frequency Characteristic>

Hereinafter, operations of the dynamic fringe pattern generating apparatus having the above-described configuration according to the present invention will be described in detail. In the dynamic fringe pattern generating apparatus according to the present invention, by controlling voltages applied to the electrodes, fringe patterns having a multiple spatial frequency characteristic and a multi-stage phase-shifting characteristic are sequentially generated to be output.

Figure 3:
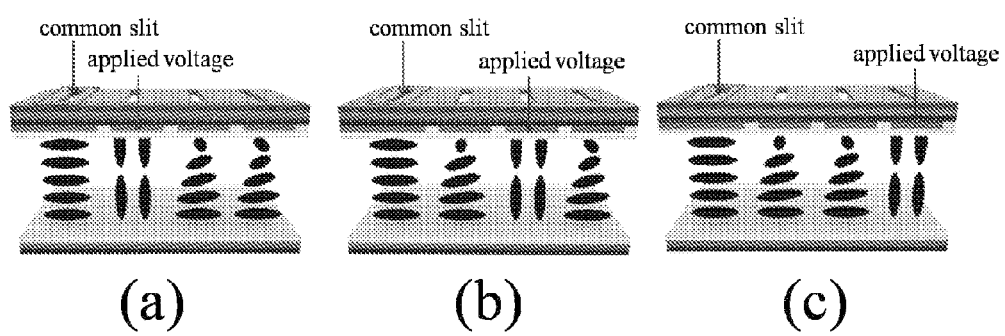
FIG. 3 is conceptual diagrams illustrating operations of implementing a multiple spatial frequency characteristic in the dynamic fringe pattern generating apparatus according to the exemplary embodiment of the present invention.

First, operations of the dynamic fringe pattern generating apparatus implementing the multiple spatial frequency characteristic where a plurality of the fringe patterns having different spatial frequencies are sequentially generated to be output are described. FIG. 3 is conceptual diagrams illustrating operations of implementing the multiple spatial frequency characteristic in the dynamic fringe pattern generating apparatus according to the exemplary embodiment of the present invention.

When polarized light is incident on the dynamic fringe pattern generating apparatus according to the present invention, since the liquid crystal in the first area of the liquid crystal layer is aligned in the homogeneous planar mode, the analyzing plate of the upper substrate having a transmission axis parallel to the polarization direction of the polarizing plate of the lower substrate always transmit the polarized light irrespective of an applied voltage. In addition, since the liquid crystal in the second area of the liquid crystal layer is aligned in the TN mode, in the case where a voltage is not applied, the polarized light cannot be transmitted; and in the case where a voltage is applied, the liquid crystal molecules are re-aligned vertically, so that the polarized light can be transmitted.

As illustrated in (a) of FIG. 3, when a voltage is applied to the first selection electrode corresponding to the second area in the state where a voltage is not applied to the reference electrode corresponding to the first area, the liquid crystal molecules in the corresponding areas are re-aligned vertically. As a result, the common slit allows the light to be output and the selection slit in the area applied with the voltage allows the light to be output, so that a fringe pattern is generated. In this case, the spatial frequency of the generated fringe pattern is determined according to the separation distance between the common slit and the first selection slit.

In the dynamic fringe pattern generating apparatus according to the present invention, the slit array is configured to include the common slit and a plurality of the selection slits having different separation distances, and the selection electrodes are sequentially selected to apply the voltage, so that the fringe patterns having different spatial frequencies are sequentially generated. In this manner, the multiple spatial frequency characteristic is implemented.

As illustrated in FIG. 3, when the voltage is sequentially applied to the first, second, and third selection electrodes corresponding to the second area, the fringe patterns having different spatial frequencies are sequentially generated according to the position of the electrode applied with the voltage.

<Method of Driving Dynamic Fringe Pattern Generating Apparatus—Multi-Stage Phase Shifting Characteristic>

Figure 4:
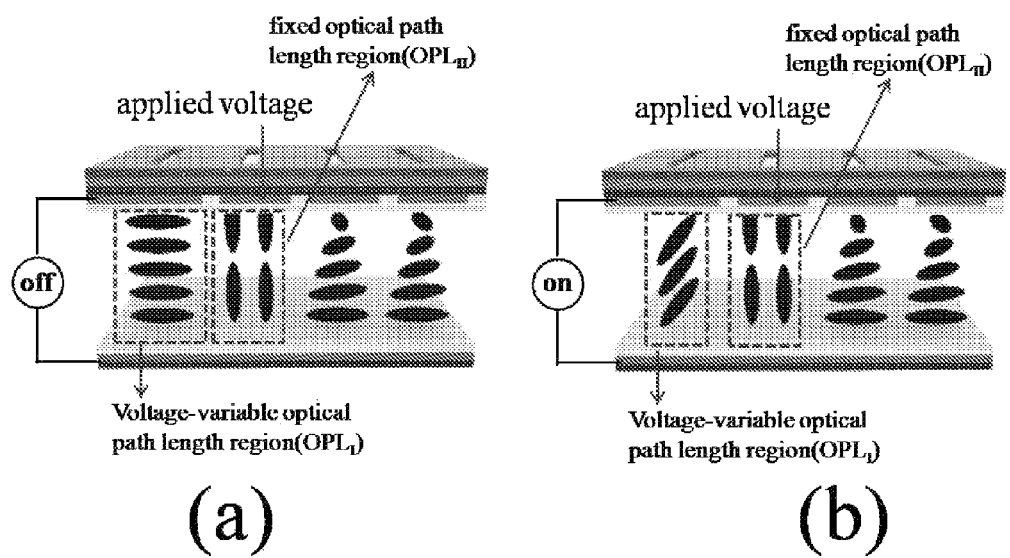
FIG. 4 is conceptual diagrams illustrating operations of implementing a phase-shifting characteristic of a fringe pattern in the dynamic fringe pattern generating apparatus according to the exemplary embodiment of the present invention.

Hereinafter, operations of the dynamic fringe pattern generating apparatus phase-shifting a fringe pattern having a spatial frequency will be described. FIG. 4 is conceptual diagrams illustrating operations of implementing a phase-shifting characteristic of a fringe pattern in the dynamic fringe pattern generating apparatus according to the exemplary embodiment of the present invention.

Referring to (a) of FIG. 4, when a voltage is applied to the first selection electrode in the state where a voltage is not applied to the reference electrode, a fringe pattern is not generated by the light beams transmitting the common slit and the first selection slit. The fringe pattern of the state where a voltage is not applied to the reference electrode is defined as Phase '0'.

Referring to (b) of FIG. 4, when a voltage is applied to the liquid crystal molecule at the position corresponding to the common slit, the tilting angle is changed, so that the effective refractive index of the liquid crystal layer is also changed. If the effective refractive index of the liquid crystal layer is changed, the optical path length (OPL) of the light passing through the liquid crystal layer is changed.

On the contrary, when a voltage is applied to a vertically-aligned liquid crystal molecule, since the initial state of the liquid crystal molecule is not changed, the OPL of the light passing through the slit is changed.

Accordingly, a difference in the OPL of the light passing through the two slits occurs according to a change of the voltage applied to the common slit. The difference is called an optical path difference (OPD). The phase shifting value of the fringe pattern is determined according to the OPD.

Figure 5:
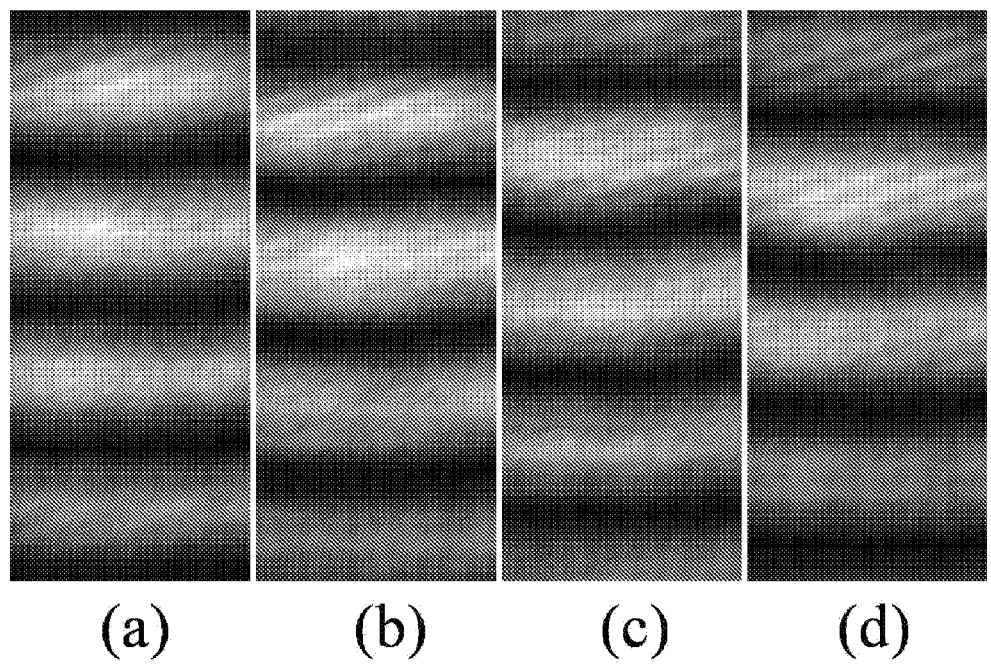
FIG. 5 is diagrams illustrating CCD images of 4-step phase shifted fringe patterns with respect to fringe patterns having a spatial frequency of 200 μm.
Figure 6:
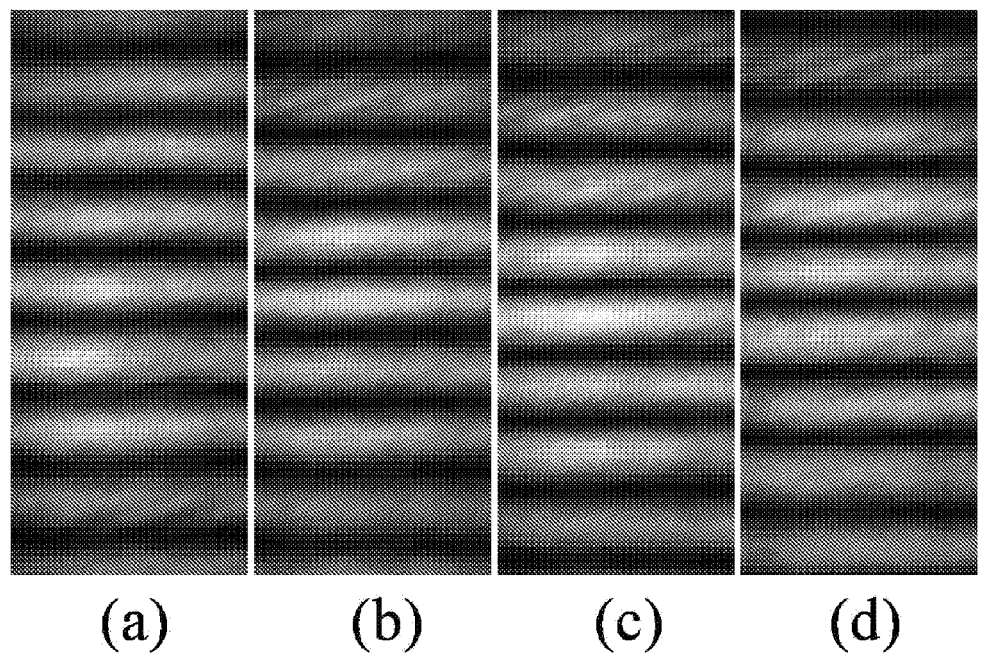
FIG. 6 is diagrams illustrating CCD images of 4-step phase shifted fringe patterns with respect to fringe patterns having a spatial frequency of 400 μm.
Figure 7:
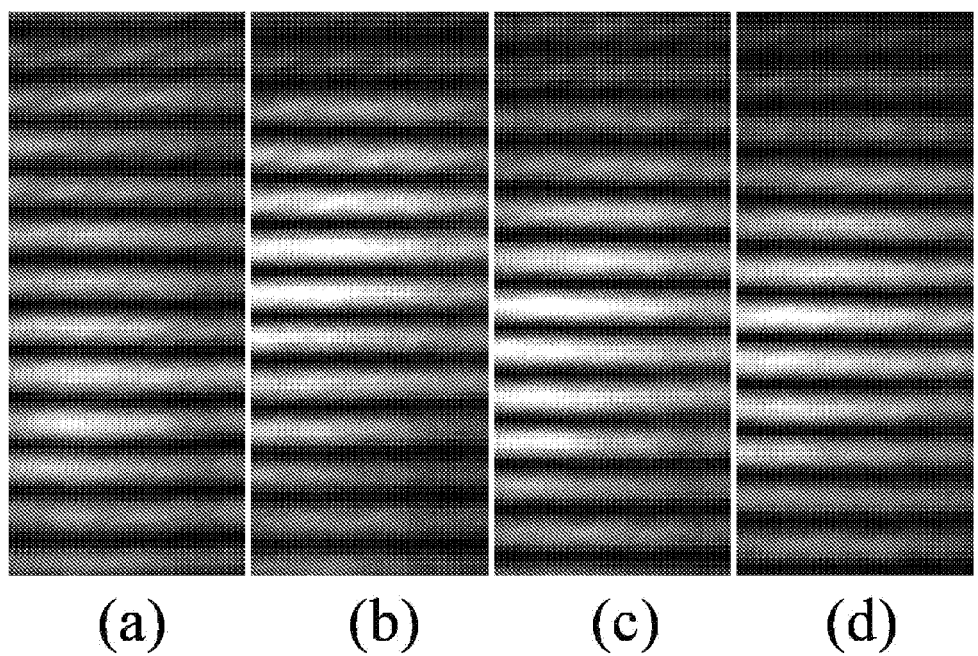
FIG. 7 is diagrams illustrating CCD images of 4-step phase shifted fringe patterns with respect to fringe patterns having a spatial frequency of 600 μm.
Figure 8:
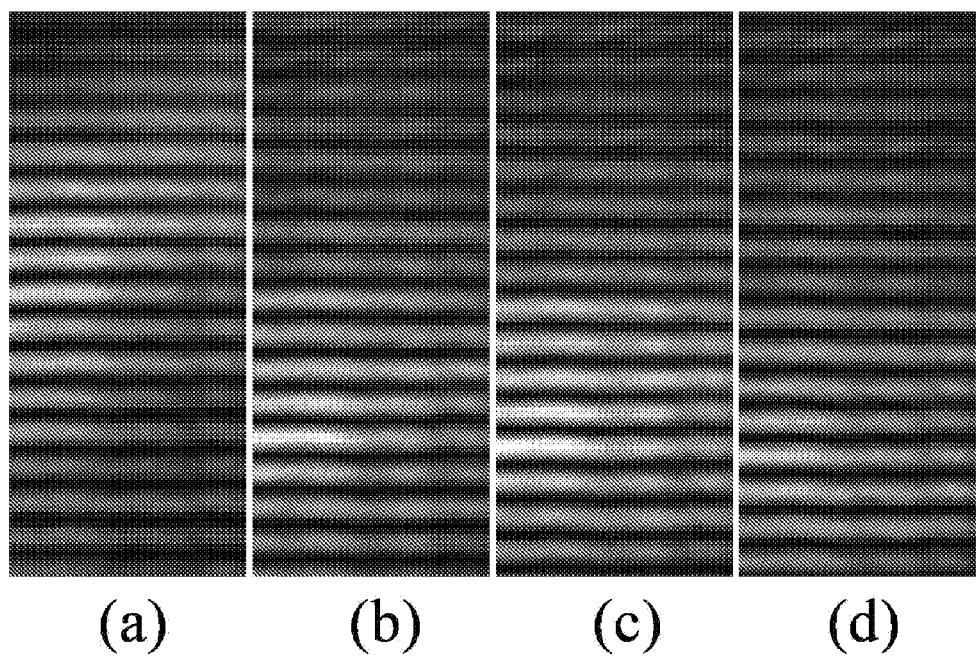
FIG. 8 is diagrams illustrating CCD images of 4-step phase shifted fringe patterns with respect to fringe patterns having a spatial frequency of 800 μm.

FIG. 5 illustrates sequential shifting of the fringe pattern having the same period according to the voltage applied to the slits having the same separation distance. FIG. 5 is diagrams illustrating CCD images of 4-step phase shifted fringe patterns with respect to fringe patterns having a spatial frequency of 200 μm. Similarly to FIG. 5 illustrates sequential shifting of the fringe pattern having the same period according to the voltage applied to the slits having the same separation distance. FIG. 6 is diagrams illustrating CCD images of 4-step phase shifted fringe patterns with respect to fringe patterns having a spatial frequency of 400 μm. It can be understood from FIG. 5 and FIG. 6 that the fringe pattern having the same period is sequentially phase-shifted by the control of the voltage applied to the slits.

In the dynamic fringe pattern generating apparatus according to the present invention, the effective refractive index is changed according to a change in voltage applied to the liquid crystal in the first area, so that the phase retardation is increased. In this case, the phase retardation value is determined by the following Mathematical Formula 1. It can be understood from Mathematical Formula 1 that the phase retardation value $\Gamma$ can be adjusted according to the applied voltage.

$$\Gamma = \frac{2\pi n_{\mathit{eff}} d}{\lambda} \qquad \text{[Mathematical Formula 1]}$$

Figure 9:
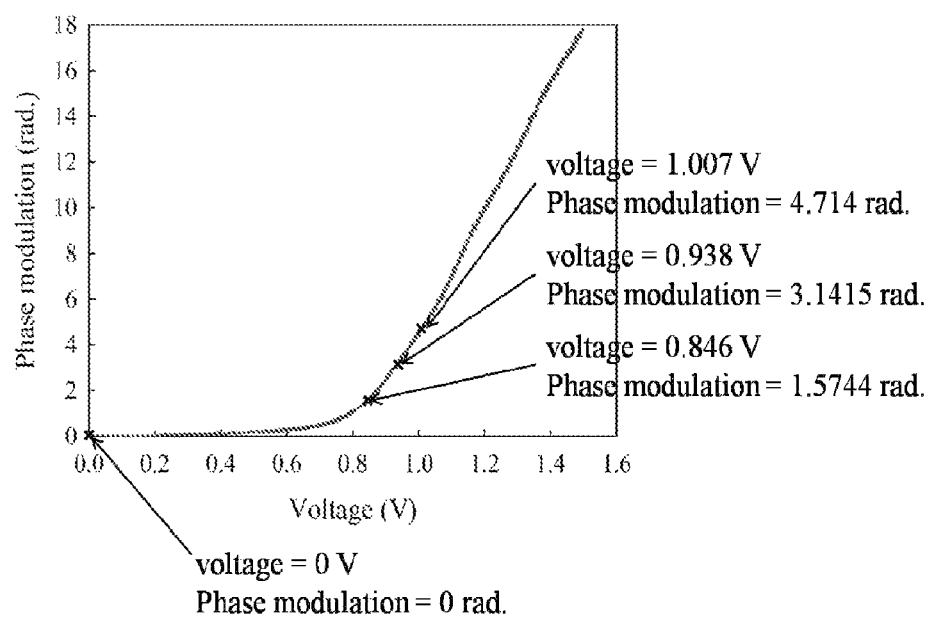
FIG. 9 is a graph illustrating a phase-shifting value of a fringe pattern according to a voltage applied to a common electrode.

Herein, $n_{\mathit{eff}}$ denotes an effective refractive index of the liquid crystal layer, which is changed from ne to no according to a change in applied voltage, and d denotes a thickness of the liquid crystal layer. FIG. 9 is a graph illustrating a phase-shifting value causing shifting of a fringe pattern according to the voltage applied to the common electrode. It can be understood that the phase shifting of $3\pi/2$ or more is stably driven for implementing the 4-step phase shifting.

<Method of Manufacturing Dynamic Fringe Pattern Generating Apparatus>

Hereinafter, a method of manufacturing the above-described dynamic fringe pattern generating apparatus will be described in detail. The method of manufacturing the dynamic fringe pattern generating apparatus according to the present invention is configured to include steps of (a) forming an upper layer; (b) forming a lower layer; and (c) disposing the upper layer and the lower layer to be separated by a predetermined separation distance from each other, adhering the upper and lower layers, and injecting liquid crystal between the upper and lower layers.

The step (b) is configured to include steps of (b1) forming a lower transparent electrode layer; (b2) depositing a lower alignment layer on a first plane of the lower transparent electrode layer; and (b3) performing an alignment process on the lower alignment layer in one direction, so that the lower layer is formed.

Figure 10:
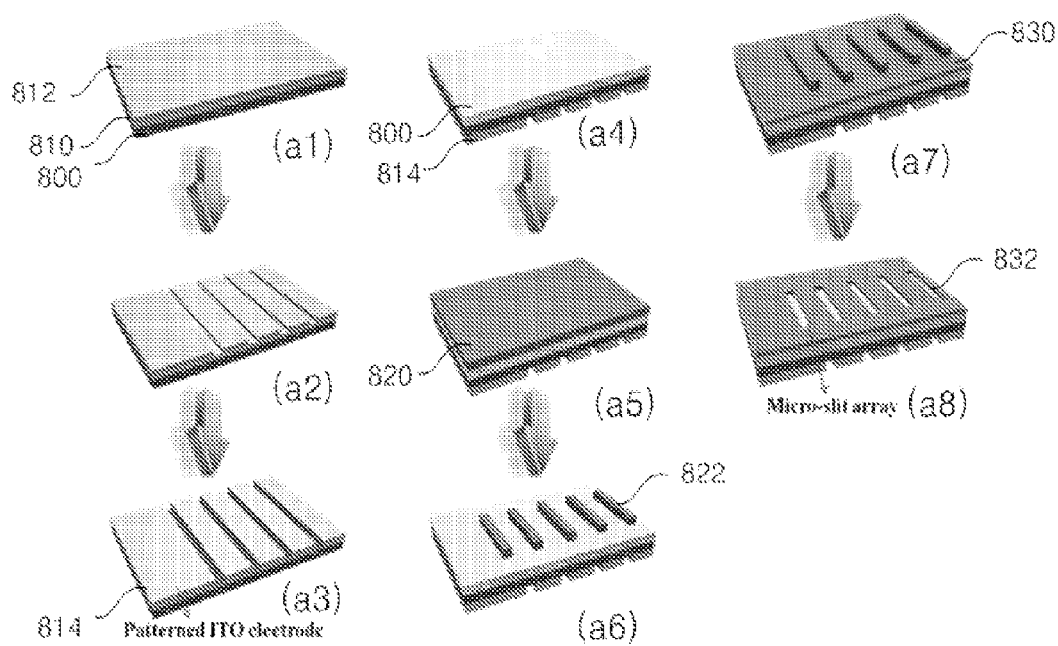
FIG. 10 is a diagram illustrating a sequence of processes of forming an upper layer in a method of manufacturing the dynamic fringe pattern generating apparatus according to the present invention.

FIG. 10 is a diagram illustrating a sequence of processes of forming the upper layer in the method of manufacturing the dynamic fringe pattern generating apparatus according to the present invention.

Referring to FIG. 10, in the step of forming the upper layer, first, a transparent electrode material 810 is deposited on the first plane of the transparent substrate 800, a photoresist 812 is deposited (a1), patterning is performed by using a photolithography process a2, and a plurality of upper electrodes 814 are formed (a3).

Next, in order to form a slit array layer including a slit array constructed with a plurality of slits on a second plane facing the first plane of the transparent substrate, a photoresist 820 is deposited on the second plane of the transparent substrate 800 (a5), and after that, a photoresist layer 822 is formed by pattering in a micro-slit form (a6).

Next, non-transparent aluminum (Al) 830 is deposited on the photoresist layer 822 which is patterned in the micro-slit form (a1), and after that, the photoresist is removed through a lift-off process, so that a micro-slit array 832 is formed (a8).

Next, a material for the upper alignment layer is deposited on the first plane of the transparent substrate on which the upper electrodes are formed, and after that, the alignment process is performed in the first direction by using a method such as rubbing. Next, the entire area is divided into the first and second areas, and an alignment process is performed in a second direction perpendicular to the first direction by using a method such as rubbing, so that the first area and the second area are aligned in the perpendicular alignment directions.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

A dynamic fringe pattern generating apparatus according to the present invention can be widely used as an apparatus of generating a fringe pattern used for a three-dimensional surface profilometer in the fields of medical industry, robotics industry, and industrial measurement instrument.

What is claimed is:

1. A dynamic fringe pattern generating apparatus comprising:
    a liquid crystal layer configured to include a first area where liquid crystal is aligned in a first mode and a second area where liquid crystal is aligned in a second mode;
    a lower layer disposed on a first plane of the liquid crystal layer; and
    an upper layer disposed on a second plane facing the first plane of the liquid crystal layer,
    wherein the lower layer is configured to include:
    a lower alignment layer which is disposed to be in contact with first plane of the liquid crystal layer and is aligned in a first direction; and
    a lower transparent electrode layer which is disposed so that the one surface is in contact with the lower alignment layer,
    wherein the upper layer is configured to include:
    a transparent substrate constructed with an insulating material;
    an upper alignment layer which is disposed to be in contact with a second plane of the liquid crystal layer and is aligned so that regions corresponding to first and second areas of the liquid crystal layer are aligned in different alignment directions;
    an upper transparent electrode layer which is disposed between the first plane of the transparent substrate and the upper alignment layer and is configured to a single reference electrode formed at a position corresponding to the first area and a plurality of selection electrodes formed at positions corresponding to the second area; and
    a slit array layer which is disposed on the second plane facing the first plane of the transparent substrate constructed with a non-transparent material and is configured to include a slit array including a common slit and a plurality of selection slits,
    wherein the common slit of the slit array is disposed above the first area of the liquid crystal layer, and the selection slits are disposed above the second area of the liquid crystal layer, and wherein the reference electrode and a plurality of the selection electrodes are disposed at positions corresponding to the common slit and the selection slits.

2. The dynamic fringe pattern generating apparatus according to claim 1, wherein in a state where polarized light capable of passing through the first area is provided to the lower layer, spatial frequency and phase shifting of a fringe pattern output through the slit array can be adjusted by controlling voltages applied to the reference electrode and the selection electrodes.

3. The dynamic fringe pattern generating apparatus according to claim 1, further comprising a polarizing plate (polarizer) on the lower layer, wherein a polarization direction of the polarizing plate is parallel to the alignment direction of the lower alignment layer.

4. The dynamic fringe pattern generating apparatus according to claim 1, wherein further comprising an analyzing plate (analyzer) on the upper layer, wherein a polarization direction of the analyzing plate is parallel to the alignment direction of the lower alignment layer.

5. The dynamic fringe pattern generating apparatus according to claim 1, wherein the liquid crystal in the first area of the liquid crystal layer is aligned in a homogeneous planar mode, and the liquid crystal in the second area is aligned in a twisted nematic (TN) mode.

6. The dynamic fringe pattern generating apparatus according to claim 1, wherein the upper and lower alignment layers which are in contact with the first area of the liquid crystal layer are aligned in the same direction, and the upper and lower alignment layers which are in contact with the second layer are aligned in perpendicular directions.

7. The dynamic fringe pattern generating apparatus according to claim 1, wherein the liquid crystal of the liquid crystal layer has dielectric anisotropy ($\Delta\in$) of more than 0.

8. The dynamic fringe pattern generating apparatus according to claim 1, wherein the first area of the liquid crystal is aligned so that light passes through irrespective of an applied voltage, and the second area of the liquid crystal is aligned so that light passes through when a voltage is applied to the second area.

9. The dynamic fringe pattern generating apparatus according to claim 1, wherein the first area is a variable OPL region where an optical path length (hereinafter, referred to as an 'OPL') is varied according to an applied voltage, and the second area is a fixed OPL region where the OPL is constant after a predetermined voltage is applied.

10. The dynamic fringe pattern generating apparatus according to claim 1,
wherein in a state where a voltage is not applied to the reference electrode, a voltage is applied to one selection electrode, so that the fringe pattern is generated, and
wherein a spatial frequency of the fringe pattern is determined according to a separation distance between the common slit and the selection slit from which light is output.

11. The dynamic fringe pattern generating apparatus according to claim 10, wherein the selection electrodes to which voltages are to be applied are sequentially changed, so that a plurality of the fringe patterns having different spatial frequencies are sequentially generated.

12. The dynamic fringe pattern generating apparatus according to claim 1,
wherein by applying a voltage to one of the selection electrodes and adjusting a voltage applied to the reference electrode, the fringe pattern generated by light passing through the common slit and the selection slit corresponding to the selection electrode applied with the voltage is phase-shifted, and
wherein a spatial frequency of the fringe pattern is determined according to a separation distance between the common slit and the selection slit from which light is output.

13. The dynamic fringe pattern generating apparatus according to claim 1, wherein by sequentially controlling a voltage applied to the reference electrode and a voltage applied to the selection electrodes, a plurality of the fringe patterns having different spatial frequencies are output, and the fringe pattern having an arbitrary spatial frequency is phase-shifted.

14. A method of manufacturing a dynamic fringe pattern generating apparatus, comprising steps of:
(a) forming an upper layer;
(b) forming a lower layer; and
(c) disposing the upper layer and the lower layer to foe separated by a predetermined separation distance, adhering the upper and lower layers, injecting liquid crystal between the upper and lower layers,
wherein the step (a) is configured to include steps of:
(a1) depositing a transparent electrode material on a first plane of a transparent substrate and patterning so as to form an upper transparent electrode layer configured to include a plurality of electrodes;
(a2) forming a slit array layer including a slit array configured to include a plurality of slits on a second plane facing the first plane of the transparent substrate;
(a3) depositing an upper alignment layer on the first plane of the transparent substrate where the upper transparent electrode layer is formed; and
(a4) dividing the upper alignment layer into a first area and a second area and alignment-processing the first area and the second area in different alignment directions, and
wherein the step (b) is configured to include steps of:
(b1) forming a lower transparent electrode layer;
(b2) forming a lower alignment layer on a first plane of the lower transparent electrode layer;
(b3) alignment-processing the lower alignment layer in one alignment direction.

15. The method according to claim 14, wherein the step (a2) includes steps of:
forming a photoresist layer on the second plane facing the first plane of the transparent substrate;
patterning the photoresist layer in a slit array form;
depositing a non-transparent material for the slit array layer on a surface of the patterned photoresist layer; and
removing the photoresist layer so as to form the slit array layer including the slit array.

16. The method according to claim 14,
wherein the first area of the upper alignment layer and the lower alignment layer are alignment-processed in the same alignment direction, and
wherein the second area of the upper alignment layer and the lower alignment layer are alignment-processed in perpendicular alignment directions.

17. The method according to claim 14, wherein electrodes which are electrically isolated are disposed under the slits.

18. The method according to claim 14, wherein the slit array is configured so that a plurality of the slits are disposed with a period of a constant distance.

* * * * *